(12) United States Patent
Oliva et al.

(10) Patent No.: US 10,998,006 B1
(45) Date of Patent: May 4, 2021

(54) METHOD AND SYSTEM FOR PRODUCING BINAURAL IMMERSIVE AUDIO FOR AUDIO-VISUAL CONTENT

(71) Applicant: Turku University of Applied Sciences Ltd, Turku (FI)

(72) Inventors: David Oliva, Turku (FI); Pertti Ranttila, Turku (FI); Lasse Pouru, Turku (FI)

(73) Assignee: Turku University of Applied Sciences Ltd, Turku (FI)

( * ) Notice: Subject to any disclaimer, the term of this patent is extended or adjusted under 35 U.S.C. 154(b) by 0 days.

(21) Appl. No.: 17/115,080

(22) Filed: Dec. 8, 2020

(51) Int. Cl.
  *H04N 9/80* (2006.01)
  *G11B 27/10* (2006.01)
  *H04N 5/93* (2006.01)

(52) U.S. Cl.
  CPC .................................. *G11B 27/10* (2013.01)

(58) Field of Classification Search
  CPC ........... H04N 21/4341; H04N 21/4394; H04N 21/44008; H04S 5/00; H04S 2400/11; H04S 2400/13; G10L 17/26; G10L 25/51; G10L 25/30; G10L 15/16; G06N 20/00; G06K 9/00744; G06F 16/60
  USPC ........ 386/241, 239, 278, 281, 285, 248, 249
  See application file for complete search history.

(56) References Cited

U.S. PATENT DOCUMENTS

| | | | |
|---|---|---|---|
| 10,575,094 B1 * | 2/2020 | Slack | H04R 5/04 |
| 10,820,131 B1 * | 10/2020 | Oliva Elorza | H04N 21/4341 |
| 2012/0059845 A1 * | 3/2012 | Covell | H04H 60/64 |
| | | | 707/769 |

* cited by examiner

*Primary Examiner* — Robert Chevalier
(74) *Attorney, Agent, or Firm* — Ziegler IP Law Group, LLC

(57) ABSTRACT

A method for producing binaural immersive audio for audio-visual content. The method includes: receiving audio-visual content including video and audio; identifying audio-producing object(s) represented in given frame of video; analysing audio corresponding to given frame using first process (FP) to extract first audio track candidate; analysing audio corresponding to given frame using second process (SP) to extract second audio track candidate; determining first and second time-based match scores for first and second audio track candidates, respectively, based on match between given audio track candidate and audio-producing object(s) in given frame; selecting, for given frame of the video, at least one of first audio track candidate and second audio track candidate as playback audio based on first and second time-based match scores; and processing playback audio to produce the binaural immersive audio for the given frame of the video in the audio-visual content.

19 Claims, 5 Drawing Sheets

METHOD AND SYSTEM FOR PRODUCING BINAURAL IMMERSIVE AUDIO FOR AUDIO-VISUAL CONTENT

TECHNICAL FIELD

The present disclosure relates to methods for producing binaural immersive audio for audio-visual content. Moreover, the present disclosure also relates to systems for producing binaural immersive audio for audio-visual content.

BACKGROUND

In the past few decades, creation and consumption of audio-visual (NV) material has become very large and complex. Hundreds of hours of new audio-visual material are uploaded to the Internet every hour, and over 10 billion audio-videos are viewed worldwide every single day. Most of these audio-videos are created with cheap or lower quality recording devices, for instance with mobile phones or action-type cameras, and they are shared and reshared through the Internet via streaming services like YouTube® and Vimeo®, or via social media platforms like WhatsApp®, YouTube®, Facebook®, Instagram®, Twitter®, and others.

When an audio-video file has been recorded with such low-cost methods, and before it has been modified by any improvement algorithm or human-based process, the audio-video file typically includes only one video file and one audio file.

Sounds are typically captured with one or more microphones, and therefore the audio is typically saved in most cases as mono or stereo. This format is not able as such to provide an immersive or realistic experience to a viewer of the audio-video file (i.e. an audio-visual content), because it is not able to reproduce a hearing experience that the same viewer would have experienced at a location where the recording was performed. In many cases, creators and consumers of such audio-visual content may benefit from processing techniques that modify the original audio-video file to provide at the time of viewing an improved experience with more immersive and realistic sound field.

However, existing processing techniques that modify the original audio-video file in such a manner suffer from several limitations. In an example, some existing processing techniques require input actions from the creators and/or the viewers of the audio-video file. Many times, the creators and/or the viewers do not properly know usage, importance and effect of various parameters and settings in such processing techniques. Therefore, human-input dependency makes these processing techniques error-prone and cumbersome to employ. In another example, the existing processing techniques are too slow and computationally expensive. Therefore, such techniques cannot be employed practically for real-time audio-video file modification. In yet another example, the existing processing techniques are not sufficiently well-developed to yield high-quality output.

Therefore, in light of the foregoing discussion, there exists a need to overcome the aforementioned drawbacks associated with the existing processing techniques for providing an immersive audio experience for audio-visual content.

SUMMARY

The present disclosure seeks to provide a method for producing binaural immersive audio for an audio-visual content. The present disclosure also seeks to provide a system for producing binaural immersive audio for an audio-visual content. An aim of the present disclosure is to provide a solution that overcomes at least partially the problems encountered in prior art.

In one aspect, an embodiment of the present disclosure provides a method for producing binaural immersive audio for an audio-visual content, the method comprising:
- receiving the audio-visual content, wherein the audio-visual content comprises a video and an audio;
- identifying at least one audio-producing object represented in a given frame of the video;
- analysing the audio corresponding to the given frame using a first process to extract a first audio track candidate;
- analysing the audio corresponding to the given frame using a second process to extract a second audio track candidate;
- determining a first time-based match score for the first audio track candidate and a second time-based match score for the second audio track candidate, based on a match between a given audio track candidate and the at least one audio-producing object in the given frame;
- selecting, for the given frame of the video, at least one of the first audio track candidate and the second audio track candidate as a playback audio based on the first time-based match score and the second time-based match score respectively; and
- processing the playback audio to produce the binaural immersive audio for the given frame of the video in the audio-visual content.

In another aspect, an embodiment of the present disclosure provides a system for producing binaural immersive audio for an audio-visual content, the system comprising at least one server configured to:
- receive the audio-visual content, wherein the audio-visual content comprises a video and an audio;
- identify at least one audio-producing object represented in a given frame of the video;
- analyse the audio corresponding to the given frame using a first process to extract a first audio track candidate;
- analyse the audio corresponding to the given frame using a second process to extract a second audio track candidate;
- determine a first time-based match score for the first audio track candidate and a second time-based match score for the second audio track candidate, based on a match between a given audio track candidate and the at least one audio-producing object in the given frame;
- select, for the given frame of the video, at least one of the first audio track candidate and the second audio track candidate as a playback audio based on the first time-based match score and the second time-based match score respectively; and
- process the playback audio to produce the binaural immersive audio for the given frame of the video in the audio-visual content.

Embodiments of the present disclosure substantially eliminate or at least partially address the aforementioned problems in the prior art, and enable an immersive or realistic experience to the viewer of the audio-visual content.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1A:
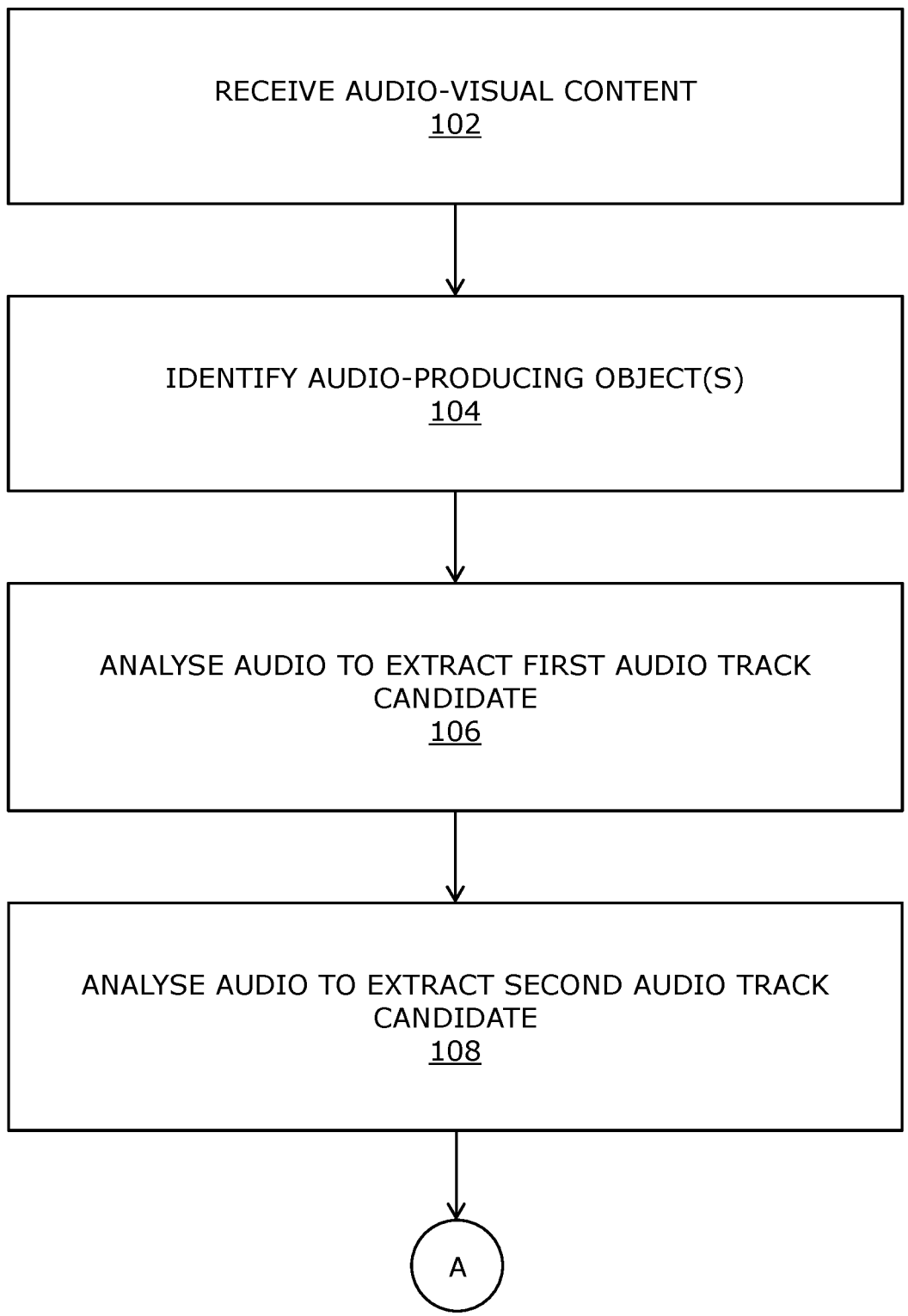
FIGS. 1A and 1B illustrate steps of a method for producing binaural immersive audio for an audio-visual content, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a method for producing binaural immersive audio for an audio-visual content, the method comprising:
- receiving the audio-visual content, wherein the audio-visual content comprises a video and an audio;
- identifying at least one audio-producing object represented in a given frame of the video;
- analysing the audio corresponding to the given frame using a first process to extract a first audio track candidate;
- analysing the audio corresponding to the given frame using a second process to extract a second audio track candidate;
- determining a first time-based match score for the first audio track candidate and a second time-based match score for the second audio track candidate, based on a match between a given audio track candidate and the at least one audio-producing object in the given frame;
- selecting, for the given frame of the video, at least one of the first audio track candidate and the second audio track candidate as a playback audio based on the first time-based match score and the second time-based match score respectively; and
- processing the playback audio to produce the binaural immersive audio for the given frame of the video in the audio-visual content.

In another aspect, an embodiment of the present disclosure provides a system for producing binaural immersive audio for an audio-visual content, the system comprising at least one server configured to:
- receive the audio-visual content, wherein the audio-visual content comprises a video and an audio;
- identify at least one audio-producing object represented in a given frame of the video;
- analyse the audio corresponding to the given frame using a first process to extract a first audio track candidate;
- analyse the audio corresponding to the given frame using a second process to extract a second audio track candidate;
- determine a first time-based match score for the first audio track candidate and a second time-based match score for the second audio track candidate, based on a match between a given audio track candidate and the at least one audio-producing object in the given frame;
- select, for the given frame of the video, at least one of the first audio track candidate and the second audio track candidate as a playback audio based on the first time-based match score and the second time-based match score respectively; and
- process the playback audio to produce the binaural immersive audio for the given frame of the video in the audio-visual content.

The present disclosure provides a method and system for producing binaural immersive audio for an audio-visual content. The binaural immersive audio comprises audio elements contributing to an overall sound experience have been separated in individual tracks and spatially filtered to match the location at which the contributing sound source seemed to be located. Such audio provides a more realistic and immersive experience to the viewer of the audio-visual content. Furthermore, the binaural immersive audio improves the quality of the videos automatically and the method of the present disclosure does not require input actions from the producers or final customers of the audio-visual content. The method of the present disclosure further enables real-time or near real-time processing of the audio-visual content and can be initialised without receiving the complete file of audio-visual content and can be performed as audio-visual content is being received or broadcasted in real time.

Throughout the present disclosure, the term "binaural immersive audio" refers to an audio experience that simulates an audio having three-dimensional spatial nature, specifically, an audio with different components perceived as coming from different directions in a three-dimensional environment. Notably, the binaural immersive audio provides an audio experience in which sounds coming from a certain direction of the video of the audio-visual content are perceived by the user to come from said direction. Such binaural immersive audio provides a highly realistic experience of the audio-visual content to the user.

The system comprises at least one server. Herein, the term "at least one server" refers to structure and/or module that includes programmable and/or non-programmable components configured to store, process and/or share information. Specifically, the at least one server includes any arrangement of physical or virtual computational entities capable of enhancing information to perform various computational tasks. Furthermore, it should be appreciated that the at least one server may be a single hardware server and/or plurality of hardware servers operating in a parallel or distributed architecture. In an example, the at least one server may include components such as memory, at least one processor, a network adapter and the like, to store, process and/or share information with other entities, such as a broadcast network or a database for receiving the audio-visual content.

The method comprises receiving the audio-visual content. The audio-visual content comprises a video and an audio. Throughout the present disclosure, the term "audio-visual content" refers to digital content comprising a visual and a sound component that can be provided to the user for consumption. Generally, in audio-visual content, the audio and the video are time-synchronized with each other. Examples of the audio-visual content include, but are not limited to, films, television programs, live performance recordings, live broadcast productions. The audio-visual content may be received from a database storing the audio-visual content or may be provided by the broadcast network.

Optionally, the audio-visual content is received from at least one audio-visual content provider or an audio-visual recording device. Herein, the audio-visual content provider may be a broadcast network, a streaming media service, an online platform hosting audio-visual content, a teleconferencing platform and so forth. The audio-visual content provider and/or a database associated therewith is communicably coupled to the at least one server. Furthermore, the audio-visual recording device may be a video camera recording audio-visual content, wherein the audio-visual recording device is communicably coupled to the at least one server for providing the recorded audio-visual content.

Optionally, the at least one server is configured to initialize a synchronization process for synchronizing a graphic object identification process, a first process, and a second process. Notably, the at least one server waits for a pre-defined time period to elapse so that the minimum data that is required for starting the process flow becomes available. The at least one server synchronizes the audio and video, and the audio is provided for the first process and the second process, and the video for the graphic object identification process for identifying at least one audio-producing object represented in a given frame of the video.

It will be appreciated that the multiple processes for producing the binaural immersive audio, such as the graphic object identification process, the first process and the second process can be performed at different processors arranged in a distributed architecture associated with the at least one server. Notably, each of the processes receive a separate input from the at least one server and provide a separate output that is synchronized without incurring recurrent computing. Such parallel arrangement of the processors significantly improves responsiveness and reduces computational load and calculation time to enable real-time or near real-time processing of the audio-visual content. Furthermore, the method for producing binaural immersive audio can be initialised without receiving the complete file of audio-visual content and can be performed as audio-visual content is being received or broadcasted in real time. Technical effect of analysing the audio corresponding for a given frame using at least a first process and a second process (at the same time or in parallel) to extract at least a first audio track candidate and a second audio track component is that it enables very rapid selection of proper audio track to be played for user. The mentioned separate input from at least one server might refer that each process receives their own input from a data source. However input data for each process can be identical (i.e. for example audio track of the video). Each process processes the input data using their own algorithm's and processes to generate process dependent outputs.

The method comprises identifying at least one audio-producing object represented in a given frame of the video. Notably, the video in the audio-visual content comprises a plurality of frames therein. Therefore, the method for producing binaural immersive audio for the audio-visual content produces binaural immersive audio for each of the plurality of frames of the video in the audio-visual content. It will be appreciated that binaural immersive audio for a given frame of the video is determined based on one or more audio-producing objects in the given frame of the video. In particular, the playback audio used for the given frame of the video corresponds to the at least one audio-producing object represented in the given frame of the video. Herein, the at least one audio-producing object refers to musical instruments, persons, and/or articles that are known to produce sound. The at least one audio-producing object may produce the sound from within or may produce an impact sound by colliding with another object. Notably, the given frame of the video is analyzed using techniques such as computer vision, image processing and machine learning to identify at least one audio-producing object represented therein.

Optionally, identifying the at least one audio-producing object represented in the given frame of the video comprises:
  employing at least one image processing algorithm for identifying a plurality of objects represented in the given frame; and
  employing at least one neural network to identify at least one audio-producing object, from amongst the plurality of objects.

Optionally, in this regard, the at least one image processing algorithm employs techniques such as computer vision, noise reduction, edge sharpening, edge detection, segmentation and so forth to identify a plurality of objects in the given frame. Notably, the at least one image processing algorithm differentiates between different objects based on the edge detection and difference in colour of pixels in the given frame. Subsequently, the at least one neural network is employed to identify at least one audio-producing object from amongst the plurality of objects. Herein, the at least one neural network may be a convolutional neural network, region-based convolutional neural network (R-CNN), Single Shot Detector (SSD), Histogram of Oriented Gradients (HOG) and the like. Optionally, the at least one neural network may be employed in conjunction with the at least one image processing algorithm to identify the at least one audio-producing object in the given frame. Furthermore, the at least one neural network may be trained using supervised or unsupervised learning techniques. In supervised learning techniques, the at least one neural network is trained using annotated and labelled datasets that are devised in a manner to allow the at least one neural network to learn distinguishing features between audio-producing objects and non-audio-producing objects. In unsupervised learning techniques, the at least one neural network is provided with unlabeled datasets, wherein the at least one neural network is trained by drawing inferences from the unlabeled datasets using principles such as cluster analysis. In an instance, the at least one neural network is trained using processed frames of a given audio-visual content, wherein the at least one neural network employs such training to process any subsequent frames in the video of the audio-visual content.

The method comprises analysing the audio corresponding to the given frame using a first process to extract a first audio track candidate. The method comprises analysing the audio corresponding to the given frame using a second process to extract a second audio track candidate. Notably, the audio of the audio-visual content comprises a plurality of audio track candidates, wherein a given audio track candidate (e.g., the first audio track candidate or the second audio track candidate) is obtained therefrom by audio decomposition. In particular, audio decomposition includes applying Short-time Fourier Transform (STFT) and feature extraction to the audio of the audio-visual content. The extracted features are further analyzed to separate each audio track candidate from the plurality of audio track candidates in the audio. The analysis of the audio may further include employing audio recognition and separation algorithms known in the art. Furthermore, each of the first process and the second process may produce audio masks for separating the audio into a predetermined number of audio track candidates. Specifically, the first process and the second process operate on frequency data produced by Short-time Fourier Transforms applied to the audio of the audio-visual content. In an instance, a number of audio-track candidates may be equal to a number of audio-producing objects identified in the video, wherein a given audio track candidate corresponds to the a given audio-producing object. In another instance, the number of audio-track candidates may be different from the number of audio-producing objects identified in the video, as some audio-producing objects may produce more than one identifiable sound and some may not produce any identifiable sound. Term corresponding frame refers to a frame for which an audio track candidate (first, second, etc) can be associated with. As an example audio played before or after the given frame can be audio which corresponds to the frame.

Optionally, the audio is separated into a plurality of audio inputs based on frequency domains. Notably, such separation of the audio into a plurality of audio inputs reduces amount of computation required for each of the processes (i.e., the first process or the second process) and improves efficiency of the operation. In an example, the first process may correspond to extracting audio-track candidates with a high-bass component and the second process may correspond to extracting audio-track candidates with a high-treble component. Notably, in such example, the audio input may be separated into different audio inputs for each of the first process and second process based on the different frequencies in the audio.

Optionally, a given audio track candidate is extracted from a plurality of audio track candidates in the audio by employing at least one audio separation algorithm and/or at least one neural network. It will be appreciated that a given audio track candidate may comprise one or more mono tracks, wherein a given audio track candidate corresponds to sound produced by a given audio-producing object, and one or more mono tracks may collectively form such sound. The at least one neural network operates on sequential data, such as a recurrent neural network, gated recurrent units, long short-term memory and the like. The at least one neural network may be pretrained for audio decomposition and sound separation to identify different sounds and classify into different audio track candidates. Notably, the at least one neural network may further be trained in real-time during the process to improve separation and identification of different audio track candidates in the audio of the audio-visual content. Furthermore, the at least one neural network employed in a given process (for example, the first process or the second process) may be trained specifically based on a type of audio input, the given process is required to analyse.

Optionally, the first process and the second process are executed parallelly. Herein, the first process and the second process are executed on different processors associated with the at least one server, wherein such parallel execution of the first process and second process reduces computational load on a given processor and enable real-time or near real-time processing of the audio-visual content. It will be appreciated that the present disclosure does not intend to limit the scope of the claims to first audio track candidate and second audio track candidate. Notably, a plurality of audio track candidates may be extracted from the audio of the audio-visual content and processed to produce binaural immersive audio. Furthermore, each of first process and second process may require a minimum length of audio information to analyse and extract the first audio track candidate and second audio track candidate respectively. Notably, upon fulfilment of such minimum length, the audio data may then be provided in short batches and matched with the video of the audio-visual content.

The method comprises determining a first time-based match score for the first audio track candidate and a second time-based match score for the second audio track candidate, based on a match between a given audio track candidate and the at least one audio-producing object in the given frame. Herein, the time-based match score may be a numeric, alphabetic or an alphanumeric value that is indicative of a degree of match between the given audio track candidate (e.g., the first audio track candidate or the second audio track candidate) with the at least one audio-producing object identified in the given frame. In other words, the time-based match score provides a likelihood of a given audio track candidate matching a sound produced by the identified at least one audio-producing object. Notably, a given audio-producing object is known to produce a given type of sound therefrom, wherein the sound produced by the given audio-producing object may be characterised by frequency, amplitude, wavelength thereof. Such characteristics of the sound are compared with a given audio-track candidate to determine a match therebetween. It will be appreciated that the time-based match score between the audio track candidate and the at least one audio-producing object is a function of time and is subject to change as subsequent frames of the video are analysed. Technical effect of this time-based match score is to take in account temporal characteristics of a sound in audio visual content. This way one can use audio information corresponding to plurality of preceding (in time) frames to select playback audio for the frame. In optional embodiment the audio information of coming frames after the given frame can be used for determining time-based match store. This way one can select audio track for a frame based on future information.

Optionally, determining a given time-based match score for the given audio track candidate comprises matching the given audio track candidate with at least one attribute of the at least one audio-producing object in the given frame, wherein the at least one attribute is at least one of: a type, a number, a spatial position, an orientation. Notably, the attributes of a given audio-producing object provide information relating to a type of sound produced by the given audio-producing object in the audio of the audio-visual content. Herein, the type as an attribute of audio-producing object provides information relating to type, specifically frequency, amplitude, wavelength, of the sound produced by the audio-producing object. The type of the audio-producing object further details if the audio-producing object is a musical instrument, a person and so forth. The number as an attribute of the at least one audio-producing object provides information about a quantity of at least audio-producing object in the given frame. It will be appreciated that the number as an attribute details quantity of audio-producing objects of the same type and quantity of audio-producing objects of different types. Notably, the quantity of audio-producing objects of the same type may contribute to a higher volume from such audio-producing object in the audio, whereas quantity of audio-producing objects of different type may require combination of different mono tracks corresponding to each type to be used as playback audio. Furthermore, the spatial position and the orientation of the at least one audio-producing object in the given frame of the video provide information relating to relative placement of the at least one audio-producing object with respect to environment of the video. Notably, the at least one attribute of the at least one audio-producing object may be determined during identifying the at least one audio-producing object represented in the given frame of the video. Consequently, information relating to such attributes and their effect on the audio may be retrieved from an audio database associated with the at least one server.

The audio database may provide information relating to frequency, amplitude, wavelength of a given type of the audio-producing object. Therefore, using such information relating to attributes of the audio-producing objects, a given time-based match score of a given audio track candidate is determined. Furthermore according to additional or alternative embodiment audio database might include trained and untrained neural network models. This enables to select, on the fly, during processing appropriate neural network for processing. In addition neural networks can be trained by for example allowing a smart phone used by a user to record voice and associate that with view of the face camera.

Optionally, at least one neural network is employed for matching the given audio track candidate with the at least one attribute of the at least one audio-producing object in the given frame. Herein, the at least neural network is provided with information relating to the at least one attribute of the at least one audio-producing object. The at least one neural network analyses each audio track candidate to determine a match between the audio track candidate and at least one attribute of the at least one audio-producing object. Notably, the at least one neural network may be trained using labelled datasets that enable the at least one neural network to recognize and identify types of sounds produced by different audio-producing objects. Such training of the at least one neural network enables determination of the match between the given audio track candidate and the at least one audio-producing object.

The method comprises selecting, for the given frame of the video, at least one of the first audio track candidate and the second audio track candidate as a playback audio based on the first time-based match score and the second time-based match score respectively. As mentioned previously, the time-based match scores provide a likelihood of a given audio track candidate matching a sound produced by the identified at least one audio-producing object. Therefore, at least one of the audio track candidates with a high likelihood of corresponding to the at least one audio-producing object represented in the given frame of the video is selected as the playback audio.

Optionally, a given audio track candidate is selected as the playback audio when:
 a given time-based match score of the given audio track candidate is greater than a predefined match score; or
 a given time-based match score of the given audio track candidate is greater than a time-based match score of the other audio track candidate.

Optionally, in this regard, the predefined match score is a predefined threshold value for a given time-based match score, wherein a given audio track candidate is selected as the playback audio when the time-based match score thereof is greater than the predefined match score. In an instance, the first audio track candidate and the second audio track candidate have the first time-based match score and the second time-based match score greater than the predefined match score and are selected as the playback audio. Alternatively, a given audio track candidate is selected as the playback audio when a given time-based match score of the given audio track candidate is greater than a time-based match score of the other audio track candidate. For example, the first audio track candidate is selected as the playback audio when the first time-based match score is greater than the second time-based match score of the second audio track candidate.

The method comprises processing the playback audio to produce the binaural immersive audio for the given frame of the video in the audio-visual content. Herein, processing the playback audio, specifically, the selected at least one of the first audio track candidate and the second audio track candidate, comprises applying head-related transfer functions (HRTFs) to the playback audio to generate the binaural immersive audio. In particular, the head-related transfer functions describe a manner sound from a specific point will arrive at ear of the user, generally at the outer end of the auditory canal. Such head-related transfer functions (HRTFs) are known in the art. The processing may further comprise employing three-dimensional audio filters and algorithms to process the playback audio to produce binaural immersive audio.

Optionally, the system for producing binaural immersive audio for an audio-visual content further comprises storing, at a data repository, at least the produced binaural immersive audio for the given frame of the video in the audio-visual content. Notably, upon production of the binaural immersive audio for the audio-visual content, the system creates a new file for audio-visual content that is stored at the data repository. Optionally, the data repository further stores results from the first process, second process, neural network and so forth. Additionally, optionally, the method further comprises storing, at the data repository, information indicative of the at least one audio-producing object identified in the given frame of the video and information indicative of matching between the at least one attribute of the at least one audio-producing object and the given audio track candidate. Such data repository may further be employed to produce binaural immersive audio for any other audio-visual content or may be employed for the training of the neural networks. Optionally, the data repository comprises the audio database.

Optionally, the method of producing binaural immersive audio for the audio-visual content may be repeated once the complete audio-visual content has been processed in a first iteration. As mentioned previously, the at least one neural network is trained using processed frames of a given audio-visual content, wherein the at least one neural network employs such training to process any subsequent frames in the video of the audio-visual content. Notably, at completion of the first iteration, the at least one neural network is trained based on the complete audio-visual content. Therefore, a second iteration and post-processing of the audio-visual content allows use of such training of the at least one neural network to improve the binaural immersive audio produced in the first iteration. Notably, such iteration may be faster as the at least one neural network is trained and optimised. Furthermore, in an instance, the data repository has been updated with significantly novel data, the at least one neural network may be trained based on such data and the audio-visual content may be processed again thereafter.

The present disclosure also relates to the system as described above. Various embodiments and variants disclosed above apply mutatis mutandis to the system.

Optionally, the at least one server is communicably coupled to at least one audio-visual content provider or an audio-visual recording device, and wherein the at least one server is configured to receive the audio-visual content from the t least one audio-visual content provider or the audio-visual recording device.

Optionally, the at least one server is configured to identify the at least one audio-producing object represented in the given frame of the video by:
  employing at least one image processing algorithm for identifying a plurality of objects represented in the given frame; and
  employing at least one neural network to identify at least one audio-producing object, from amongst the plurality of objects.

Optionally, the at least one server is configured to employ at least one audio separation algorithm and/or at least one neural network to extract a given audio track candidate from a plurality of audio track candidates in the audio by employing.

Optionally, the at least one server is configured to match the given audio track candidate with at least one attribute of the at least one audio-producing object in the given frame to determine a given time-based match score for the given audio track candidate by, wherein the at least one attribute is at least one of: a type, a number, a spatial position, an orientation.

More optionally, the at least one server is configured to employ at least one neural network to match the given audio track candidate with the at least one attribute of the at least one audio-producing object in the given frame.

Optionally, the at least one server is configured to select a given audio track candidate as the playback audio when:
  a given time-based match score of the given audio track candidate is greater than a predefined match score; or
  a given time-based match score of the given audio track candidate is greater than a time-based match score of the other audio track candidate.

Optionally, the at least one server is configured to execute first process and the second process parallelly.

The present disclosure further provides a computer program product comprising a non-transitory computer-readable storage medium having computer-readable instructions stored thereon, the computer-readable instructions being executable by a computerized device comprising processing hardware to execute the method as described above.

DETAILED DESCRIPTION OF THE DRAWINGS

Figure 1B:
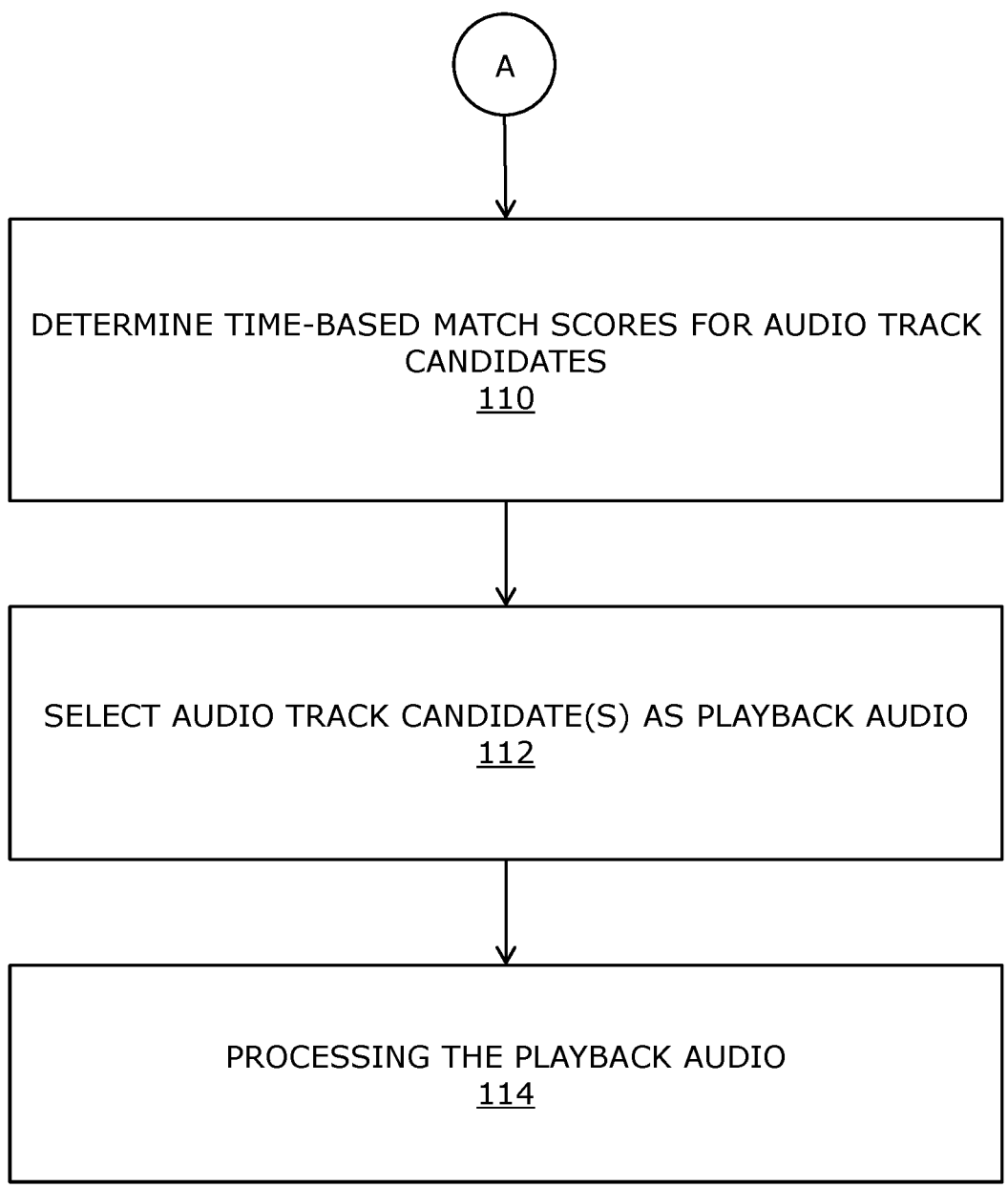

Referring to FIGS. 1A and 1B, illustrated are steps of a method for producing binaural immersive audio for an audio-visual content, in accordance with an embodiment of the present disclosure. At step 102, the audio-visual content is received, wherein the audio-visual content comprises a video and an audio. At step 104, at least one audio-producing object represented in a given frame of the video is identified. At step 106, the audio corresponding to the given frame is analysed using a first process to extract a first audio track candidate. At step 108, the audio corresponding to the given frame is analysed using a second process to extract a second audio track candidate. At step 110, a first time-based match score for the first audio track candidate and a second time-based match score for the second audio track candidate is determined, based on a match between a given audio track candidate and the at least one audio-producing object in the given frame. At step 112, for the given frame of the video, at least one of the first audio track candidate and the second audio track candidate is selected as a playback audio based on the first time-based match score and the second time-based match score respectively. At step 114, the playback audio is processed to produce the binaural immersive audio for the given frame of the video in the audio-visual content.

The steps 102, 104, 106, 108, 110, 112, and 114 are only illustrative and other alternatives can also be provided where one or more steps are added, one or more steps are removed, or one or more steps are provided in a different sequence without departing from the scope of the claims herein.

Figure 2:
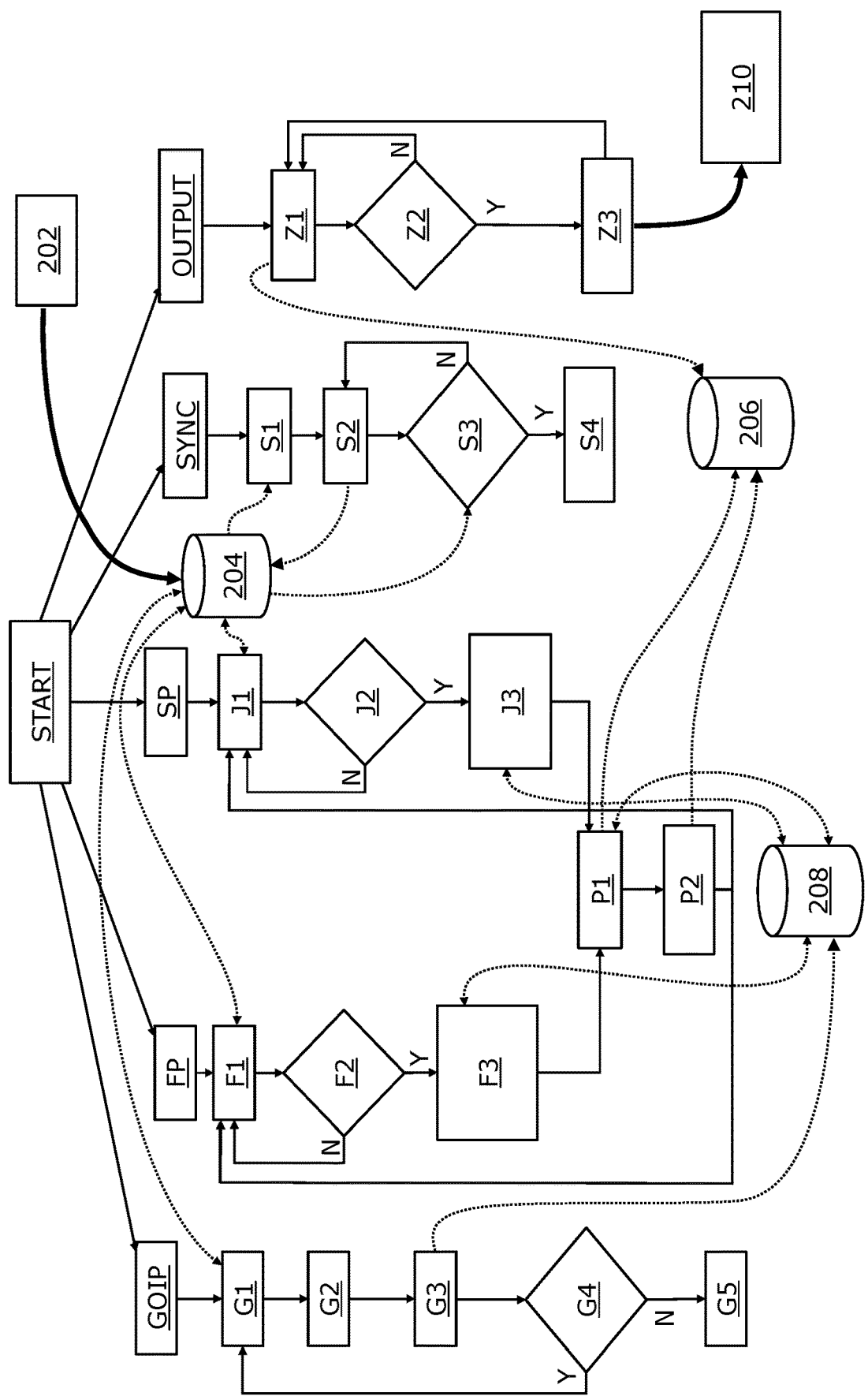
FIG. 2 illustrates an exemplary high-level process flow for producing binaural immersive audio for an audio-visual content, in accordance with an embodiment of the present disclosure.

Referring to FIG. 2, illustrated is an exemplary high-level process flow for producing binaural immersive audio for an audio-visual content, in accordance with an embodiment of the present disclosure. Equipment involved in this process flow include, but is not limited to, an audio-visual recording device 202, an input buffer 204, an output buffer 206, a data repository 208, and an audio-visual output device 210.

At START, the process flow is started, when a minimum data that is required for starting the process flow is available. The input buffer 204 obtains an audio-visual content from the audio-visual recording device 202. The audio-visual content comprises a video and an audio. The minimum data may, for example, be a video and an audio corresponding to ten frames of an audio-visual content.

At SYNC, there is initialized a synchronization process for synchronizing a graphic object identification process, a first process, and a second process. At S1, at least one server waits for a predefined time period to elapse so that the minimum data that is required for starting the process flow becomes available. At S2, the at least one server feeds the audio to the first process and the second process, and the video to the graphic object identification process. The input buffer 204 passes video data to G1 and audio data to F1 and J1. At S3, it is checked whether the video and the audio are available in the input buffer 204. If yes, then step S2 is performed until the video and the audio are no longer available in the input buffer 204. If no, then at S4, at least the synchronization process is ended, and additionally, optionally, all processes are ended.

At GOIP, there is initialized the graphic object identification process for identifying at least one audio-producing object represented in a given frame of the video. At G1, the given frame is read from the input buffer 204. At G2, the at least one audio-producing object represented in the given frame of the video is identified by employing at least one image processing algorithm for identifying a plurality of objects represented in the given frame, and employing at least one neural network to identify at least one audio-producing object, from amongst the plurality of objects. At G3, the at least one audio-producing object that is identified is stored at the data repository 208. At G4, it is checked whether a next frame is available in the input buffer. If yes, then the steps G1, G2 and G3 are performed for the next frame. If not, then at G5, all processes are ended.

At FP, there is initialized the first process for analysing the audio corresponding to the given frame. At F1, the audio corresponding to the given frame is read from the input buffer 204. At F2, it is checked whether the audio has been read successfully and is available. If no, then the steps F1 and F2 are performed again. If yes, then at step F3, a first audio track candidate is extracted from a plurality of audio track candidates in the audio by employing at least one audio separation algorithm and/or at least one neural network.

At SP, there is initialized the second process for analysing the audio corresponding to the given frame. At J1, the audio corresponding to the given frame is read from the input buffer. At J2, it is checked whether the audio has been read successfully and is available. If no, then the steps J1 and J2 are performed again. If yes, then at J3, a second audio track candidate is extracted from the plurality of audio track candidates in the audio by employing at least one audio separation algorithm and/or at least one neural network.

At P1, there is selected, for the given frame of the video, at least one of the first audio track candidate and the second audio track candidate as a playback audio based on a first time-based match score and a second time-based match score, respectively. A given time-based match score for a given audio track candidate is determined based on a match between the given audio track candidate and the at least one audio-producing object in the given frame. At P2, the selected playback audio is processed to produce binaural immersive audio for the given frame of the video, and the binaural immersive audio is written to the output buffer 206.

At OUTPUT, there is initialized the output process for outputting modified audio-visual content including the binaural immersive audio. At Z1, the output buffer 206 is read. At Z2, it is checked whether output data is available in the output buffer. If no, then steps Z1 and Z2 are performed until the output data is no longer available in the output buffer 206. If yes, then at Z3, the modified audio-visual content is generated. The modified audio-visual content is presented via the audio-visual output device 210.

It may be understood by a person skilled in the art that the FIG. 2 is merely an example for sake of clarity, which should not unduly limit the scope of the claims herein. The person skilled in the art will recognize many variations, alternatives, and modifications of embodiments of the present disclosure.

Figure 3:
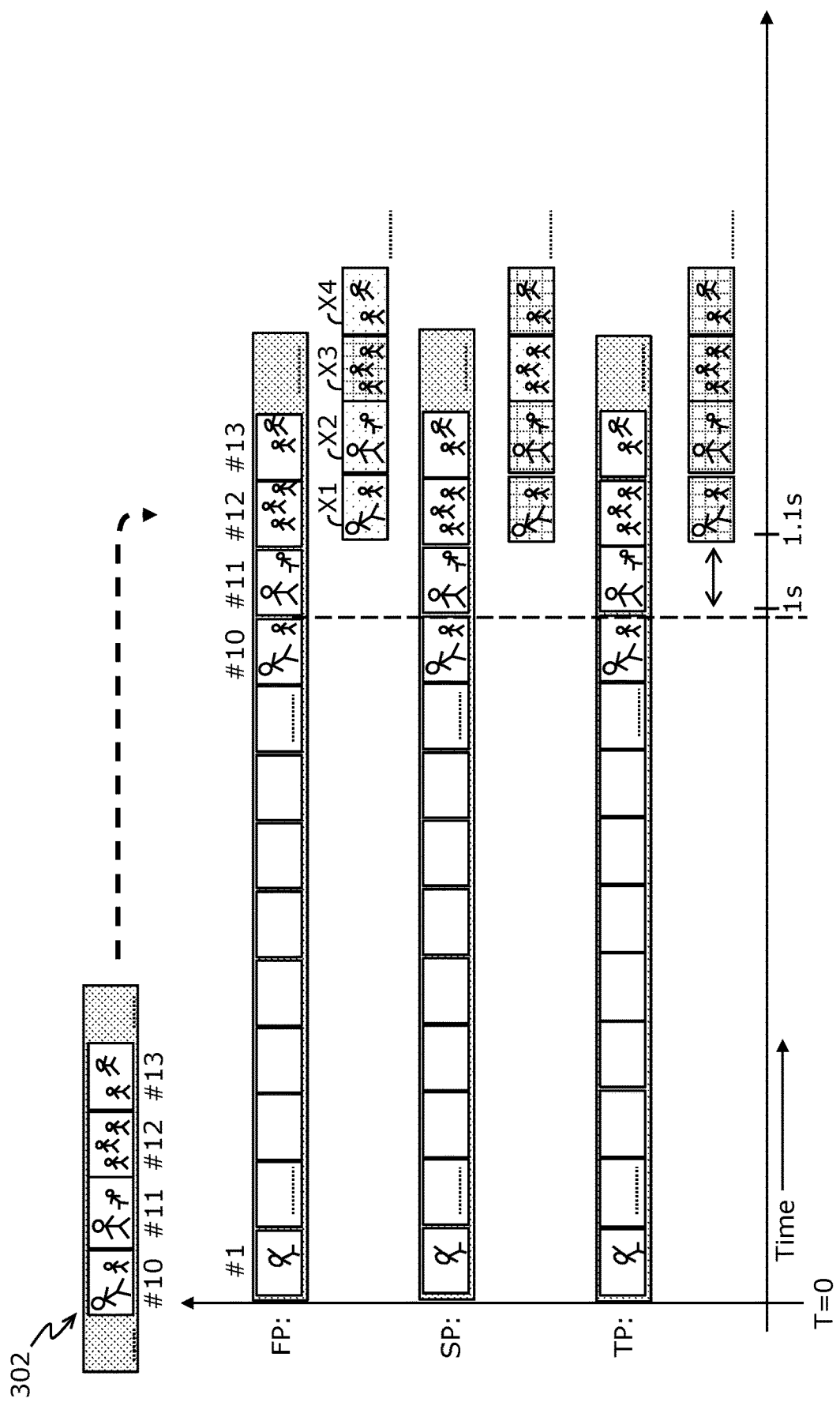
FIG. 3 illustrates an exemplary timing diagram of processing steps in production of binaural immersive audio for an audio-visual content, in accordance with an embodiment of the present disclosure.

Referring to FIG. 3, illustrated is an exemplary timing diagram of processing steps in production of binaural immersive audio for an audio-visual content, in accordance with an embodiment of the present disclosure. The timing diagram depicts how input data 302 is processed in time by three parallel processes (depicted as a first process FP, a second process SP, and a third process TP). The three parallel processes FP, SP, and TP are shown to have no relative delay. For sake of simplicity, only 10th, 11th, 12th and 13th frames of the input data 302 are shown in detail (with their frame number preceded by a hash symbol (#)). The input data 302 is an audio-visual content which includes a video (depicted as video frames with white background) and an audio (depicted as a dense dotted hatch portion surrounding the video frames). As shown, a frame rate of the input data 302 may be 10 frames per second, length of a single audio sample may be 1 second, and each frame of the input data 302 may represent a time window of a specific time duration (for example, such as 0.1 second). A delay between a given input frame and its corresponding output frame from a given process is shown to be equal to the specific time duration of 0.1 second.

The first process FP may extract a first audio track candidate comprising two separated mono tracks, the second process SP may extract a second audio track candidate comprising three separated mono tracks, and the third process TP may extract a third audio track candidate comprising four separated mono tracks. For output frames X1, X2, and X4, the first audio track candidate has a higher time-based match score than the second and third audio track candidates, and is therefore selected as a playback audio (since these output frames X1, X2, and X4 represent two audio-producing objects (depicted as two people) and there are two separated mono tracks in the first audio track candidate). However, for output frame X3, the second audio track candidate has a higher time-based match score than the first and third audio track candidates, and is therefore selected as a playback audio (since the output frame X3 represents three audio-producing objects (depicted as three people) and there are three separated mono tracks in the second audio track candidate).

Therefore, output data obtained upon processing the input data 302 would include the output frames X1, X2, X3 and X4, along with their corresponding selected playback audios.

It may be understood by a person skilled in the art that the FIG. 3 is merely an example for sake of clarity, which should not unduly limit the scope of the claims herein. The person skilled in the art will recognize many variations, alternatives, and modifications of embodiments of the present disclosure.

Figure 4:
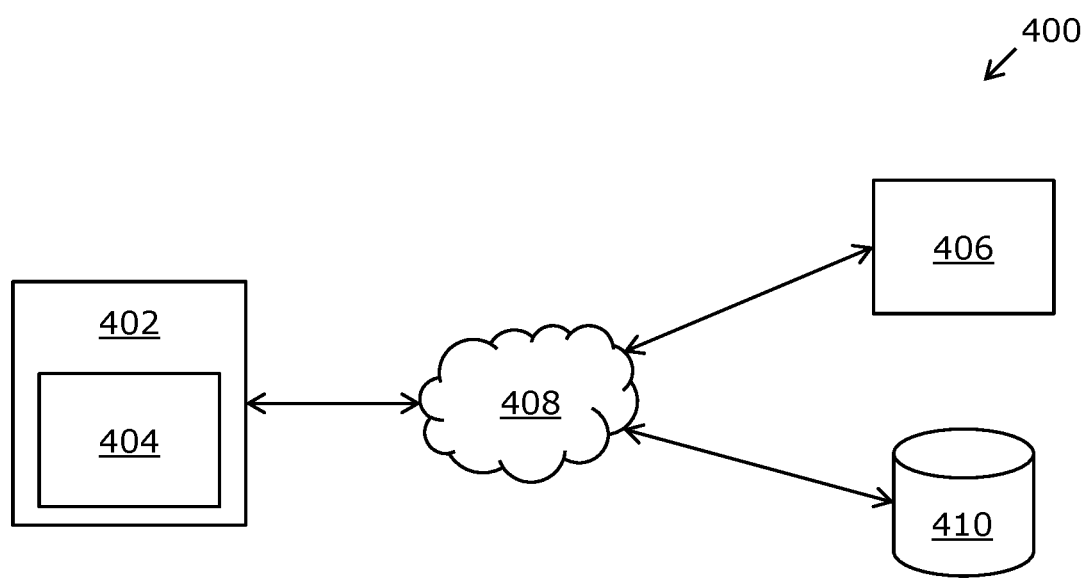
FIG. 4 is a schematic illustration of an environment where a system for producing binaural immersive audio for an audio-visual content is used, in accordance with an embodiment of the present disclosure.

Referring to FIG. 4, illustrated is a schematic illustration of an environment 400 where a system 402 for producing binaural immersive audio for an audio-visual content is used, in accordance with an embodiment of the present disclosure. The system 402 comprises at least one server (depicted as a server 404). The at least one server 404 is communicably coupled to at least one audio-visual content provider (depicted as an audio-visual content provider 406), for example, via a communication network 408. The environment 400 also includes a data repository 410 communicably coupled to the at least one server 404, for example, via the communication network 408.

It may be understood by a person skilled in the art that the FIG. 4 is merely an example for sake of clarity, which should not unduly limit the scope of the claims herein. The person skilled in the art will recognize many variations, alternatives, and modifications of embodiments of the present disclosure. In an example, the at least one server 404 is communicably coupled to an audio-visual recording device. In another example, the system 402 further comprises the data repository 410.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for producing binaural immersive audio for an audio-visual content, the method comprising:
   receiving the audio-visual content, wherein the audio-visual content comprises a video and an audio;

identifying at least one audio-producing object represented in a given frame of the video;
analysing the audio corresponding to the given frame using a first process (FP) to extract a first audio track candidate;
analysing the audio corresponding to the given frame using a second process (SP) to extract a second audio track candidate;
determining a first time-based match score for the first audio track candidate and a second time-based match score for the second audio track candidate, based on a match between a given audio track candidate and the at least one audio-producing object in the given frame;
selecting, for the given frame of the video, at least one of the first audio track candidate and the second audio track candidate as a playback audio based on the first time-based match score and the second time-based match score respectively; and
processing the playback audio to produce the binaural immersive audio for the given frame of the video in the audio-visual content.

2. The method according to claim 1, wherein the audio-visual content is received from at least one audio-visual content provider or an audio-visual recording device.

3. The method according to claim 1, wherein identifying the at least one audio-producing object represented in the given frame of the video comprises:
employing at least one image processing algorithm for identifying a plurality of objects represented in the given frame; and
employing at least one neural network to identify at least one audio-producing object, from amongst the plurality of objects.

4. The method according to claim 1, wherein a given audio track candidate is extracted from a plurality of audio track candidates in the audio by employing at least one audio separation algorithm and/or at least one neural network.

5. The method according to claim 1, wherein determining a given time-based match score for the given audio track candidate comprises matching the given audio track candidate with at least one attribute of the at least one audio-producing object in the given frame, wherein the at least one attribute is at least one of: a type, a number, a spatial position, an orientation.

6. The method according to claim 5, wherein at least one neural network is employed for matching the given audio track candidate with the at least one attribute of the at least one audio-producing object in the given frame.

7. The method according to claim 1, wherein a given audio track candidate is selected as the playback audio when:
a given time-based match score of the given audio track candidate is greater than a predefined match score; or
a given time-based match score of the given audio track candidate is greater than a time-based match score of the other audio track candidate.

8. The method according to claim 1, further comprising storing, at a data repository, at least the produced binaural immersive audio for the given frame of the video in the audio-visual content.

9. The method according to claim 1, wherein the first process (FP) and the second process (SP) are executed parallelly.

10. A system for producing binaural immersive audio for an audio-visual content, the system comprising at least one server configured to:
receive the audio-visual content, wherein the audio-visual content comprises a video and an audio;
identify at least one audio-producing object represented in a given frame of the video;
analyse the audio corresponding to the given frame using a first process (FP) to extract a first audio track candidate;
analyse the audio corresponding to the given frame using a second process (SP) to extract a second audio track candidate;
determine a first time-based match score for the first audio track candidate and a second time-based match score for the second audio track candidate, based on a match between a given audio track candidate and the at least one audio-producing object in the given frame;
select, for the given frame of the video, at least one of the first audio track candidate and the second audio track candidate as a playback audio based on the first time-based match score and the second time-based match score respectively; and
process the playback audio to produce the binaural immersive audio for the given frame of the video in the audio-visual content.

11. The system according to claim 10, wherein the at least one server is communicably coupled to at least one audio-visual content provider or an audio-visual recording device, and wherein the at least one server is configured to receive the audio-visual content from the at least one audio-visual content provider or the audio-visual recording device.

12. The system according to claim 10, wherein the at least one server is configured to identify the at least one audio-producing object represented in the given frame of the video by:
employing at least one image processing algorithm for identifying a plurality of objects represented in the given frame; and
employing at least one neural network to identify at least one audio-producing object, from amongst the plurality of objects.

13. The system according to claim 10, wherein the at least one server is configured to employ at least one audio separation algorithm and/or at least one neural network to extract a given audio track candidate from a plurality of audio track candidates in the audio by employing.

14. The system according to claim 10, wherein the at least one server is configured to match the given audio track candidate with at least one attribute of the at least one audio-producing object in the given frame to determine a given time-based match score for the given audio track candidate by, wherein the at least one attribute is at least one of: a type, a number, a spatial position, an orientation.

15. The system according to claim 14, wherein the at least one server is configured to employ at least one neural network to match the given audio track candidate with the at least one attribute of the at least one audio-producing object in the given frame.

16. The system according to claim 10, wherein the at least one server is configured to select a given audio track candidate as the playback audio when:
a given time-based match score of the given audio track candidate is greater than a predefined match score; or
a given time-based match score of the given audio track candidate is greater than a time-based match score of the other audio track candidate.

17. The system according to claim 10, further comprising a data repository communicably coupled to the at least one server, wherein the at least one server is configured to store, at the data repository, at least the produced binaural immersive audio for the given frame of the video in the audio-visual content.

18. The system according to claim 10, wherein the at least one server is configured to execute first process (FP) and the second process (FP) parallelly.

19. A computer program product comprising a non-transitory computer-readable storage medium having computer-readable instructions stored thereon, the computer-readable instructions being executable by a computerized device comprising processing hardware to execute a method as claimed in claim 1.

* * * * *